June 10, 1969     J. J. HENRY     3,449,599

TEMPERATURE CONTROL CIRCUIT

Filed Jan. 5, 1967

INVENTOR.
John J. Henry
BY
Roland A. Anderson
ATTORNEY.

United States Patent Office 3,449,599
Patented June 10, 1969

3,449,599
TEMPERATURE CONTROL CIRCUIT
John J. Henry, Oak Ridge, Tenn., assignor to the United States of America as represented by the United States Atomic Energy Commission
Filed Jan. 5, 1967, Ser. No. 607,585
Int. Cl. H03k 1/02
U.S. Cl. 307—310   3 Claims

ABSTRACT OF THE DISCLOSURE

The disclosure relates to temperature control circuits of medium accuracy for controlling the temperature of an object or space within a desired range of temperatures. Control is effected by using a temperature sensitive element, such as a thermistor, connected in a balanced bridge circuit so that changes in resistance of the thermistor, reflecting changes in temperature, will have the effect of unbalancing the bridge to produce control signals that will initiate changes in temperature of the heating or cooling system it controls and thus restores the desired temperature.

---

It has been practice in the prior art to use balanced bridge temperature control systems and affect operation of the system through the incorporation of a temperature sensitive element, such as a thermistor, which is subjected to temperature conditions of the thing or space to be regulated. These bridges have not necessarily been constructed with the object of economizing space, minimizing components and cost, while retaining a high degree of reliability and accuracy. This invention is intended to meet these problems by simplifying the circuit, reducing the components, and providing a temperature control circuit of medium accuracy and a high degree of reliability that requires little maintenance.

The invention described herein was made in the course of, or under a contract with U.S. Atomic Energy Commission.

Summary of the invention

This invention relates to a control circuit of medium accuracy for controlling the temperature of an object or space and contemplates the incorporation of a temperature sensitive element that regulates the balance of a simple bridge and produces control signals that control heating or cooling elements for the object or space to maintain the temperature within the preselected range.

Thermistor-type temperature control circuits can be categorized as follows on the basis of accuracy of control: (1) those circuits which control to within about 0.01° C.; (2) those which control within about 0.1–1° C.; and (3) those which control to within about 2–5° C.

This improved thermistor circuit for temperature control is designed specifically for medium-accuracy applications (category 2 above). The circuit was developed for a spaceflight application demanding high reliability, low weight, and small size. The improved circuit, which uses sold-state components, employs a special arrangement to compensate for the effect of ambient temperature variations on the base-to-emitter voltage of an output transistor. As compared with the prior art, this permits the elimination of one power supply and several circuit components.

Figure 1:
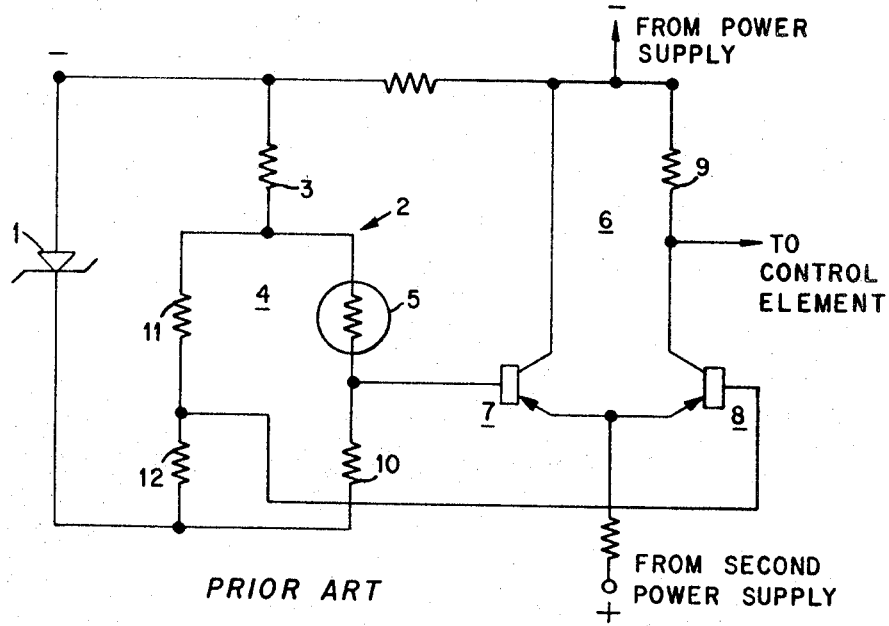
FIG. 1 is a circuit diagram of a prior art control circuit for regulating temperature.

Referring to FIG. 1, a common type of medium-accuracy temperature control circuit of the thhermistor type includes two D.C. power supplies; Zener diode 1 coupled through a conventional voltage dropping resistor 13 is provided for regulating the output of one of the supplies; a measuring network 2 which is connected across the Zener diode 1 and which consists of a resistor 3 connected in series with a resistance bridge 4 including a thermistor 5 and resistors 10, 11, and 12; and a bridge unbalance detector circuit (differential amplifier 6) including two parallel-connected identical transistors 7, 8 whose bases are connected respectively to the output points of the bridge 4. A resistor 9 is connected to the collector circuit of one of the transistors to develop a voltage which serves as the output, or control voltage, for the circuit. The resistors associated with the measuring network are precision resistors.

The thermistor 5 illustrated in FIG. 1 is placed close to or on the element whose temperature is to be controlled. The transistors 7, 8 are positioned close to each other so that they will operate at the same temperature but are remote from the thermistor in a location where they are exposed only to ambient temperature. When used in the differential amplifier configuration shown, the temperature sensitive parameters of the transistors oppose each other to cancel the effects of variations in ambient temperature and changes due to ambient temperature variation are greatly reduced in the amplifier output, i.e., the control voltage. Without such compensation the circuit in FIG. 1 would not be able to control temperature with medium-range accuracy, if ambient temperature changes.

The bridge set point resistor 10 can be changed or adjusted so that the control takes place at the desired temperature. In the circuit shown in FIG. 1, the output signal, i.e., the control voltage, can be expected to decrease as the temperature increases through the control point. If the opposite control action (control voltage increases with increasing temperature) is desired, it may be readily obtained by interchanging the thermistor 5 and set point resistor 10 positions, i.e., their connections to the rest of the circuit.

My improved control circuit is designed to accomplish the object of the circuit of FIG. 1, but with as few components as is consistent with highly reliable performance.

Figure 2:
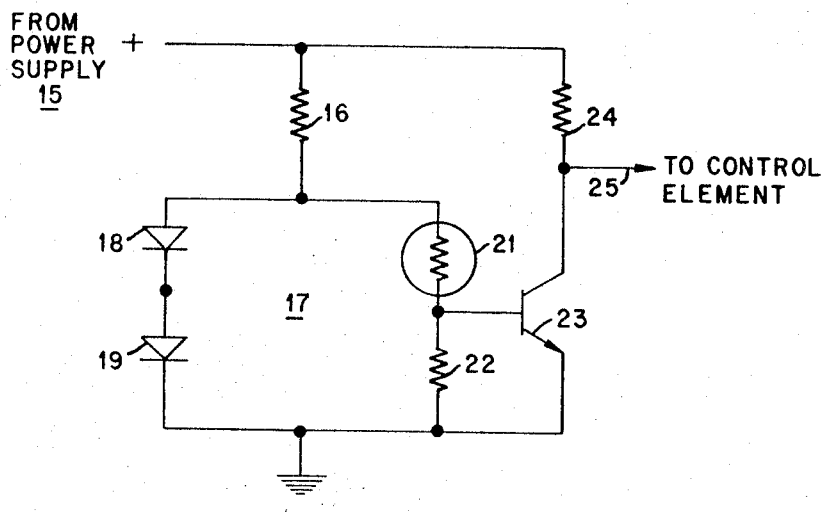
FIG. 2 is a circuit diagram of my improved temperatue contol circuit.

One embodiment of this invention, consisting throughout of standard components, is illustrated in FIG. 2. The circuit includes a low-voltage D.C. power supply 15 whose negative terminal is grounded and whose positive terminal is connected through a resistor 16, to a bridge 17. One leg of the bridge (referred to herein as the reference leg) comprises two serially connected matched forward-biased silicon diodes 18, 19 whose junction point therebetween can be considered as a virtual signal point for the bridge. The other leg (the signal leg) comprises a serially connected thermistor 21 and precision resistor 22. Both legs of the bridge are grounded.

A silicon transistor 23 is connected in grounded-emitter configuration and directly across resistor 22 to amplify any bridge unbalance. As shown, the transistor collector is connected through a resistor 24, to the positive terminal of the supply 15. Conduction of the transistor develops an output voltage, or control signal, across resistor 24; this is impressed on a lead 25 serving as the input to any suitable control element for a heating or cooling arrangement (not shown).

In discussing the operation of my improved control circuit, it will first be assumed that the silicon diodes in the bridge have been replaced by resistors. In that event, the control exercised by the circuit is subject to an unacceptable error of 2% for each 5° C. change in ambient temperature. This error is due to the normal variation of the transistor base-to-emitter voltage with temperature—the variation being −2.2 mv./°C. This corresponds to a change of 0.44%/°C. in the normal turn-on voltage (about 0.55 volt) of the transistor.

The bridge containing the silicon diodes 18, 19 essentially eliminates the above-mentioned error caused by variations in ambient temperature. To obtain proper temperature control, the silicon diodes and the transistor are positioned to be exposed to the same ambient temperature. The thermistor is mounted on or close to the element whose temperature is to be controlled. If the resistor 22 in bridge 17 is not adjustable, its value is preselected so that the bridge is balanced when the thermistor is at the desired operating temperature. The output voltage at the junction point between diodes 18, 19 is equal to the voltage on the transistor base 23 (the resistance ratio in both legs being 1:1).

The base-to-emitter portion of the transistor 23 is in essence a forward-biased silicon diode. Consequently, its temperature coefficient of resistance and its turn-on voltage are essentially the same as for the diodes 18, 19. (Silicon diodes typically have a turn-on voltage of 0.55 and operate at a voltage drop of that same value.) Thus, with the bridge at balance, the junction point between diodes 18, 19 is at 0.55 volts, and the transistor 23 is just below its turn-on voltage. A decrease in the thermistor resistance will turn on the transistor, generating a control signal to the heating or cooling element. An increase in the thermistor resistance will drive the transistor farther below the turn-on point.

To obtain essentially complete temperature compensation, it is essential that the diodes 18, 19 and the base-to-emitter portion of the transistor have corresponding characteristics. At least two matched diodes must be employed in the leg of the bridge; three (or more) can be used if the thermistor-to-resistor resistance ratio in the signal leg is altered correspondingly. Suitable compensation is not obtained (operation of the bridge is not reproducible) if the upper diode is replaced by a different kind of diode or by a resistor. It is not essential that the diodes and the transistor be of the silicon type, but all three must be of the same type.

In the circuit of FIG. 2, the output signal, i.e., the control signal, increases with a decrease in temperature when a thermistor is used for the temperature sensitive element 21. The temperature at which control action takes place may be adjusted by selecting or varying the resistance of the set point resistor 22. If the opposite control action is desired (increasing control signal with increasing temperature), the measuring element 21 and set point 22 may be interchanged.

In order to accomplish temperature control action with the stability and precision required for medium accuracy applications it is necessary to (1) provide stabilization of the measurement bridge 2 in FIG. 1 against power supply variations; (2) compensate the accompanying amplifier against ambient temperature effects; and (3) use low bridge power in the measurement leg in order to reduce self heating in the thermistor while still providing sufficient signal power to actuate the amplifier. There are a number of other possible means of temperature compensating the amplifier.

Biased diodes commonly are used to provide temperature compensation, but this approach was rejected for this application. The incorporation of a forward-biased diode in the transistor emitter circuit would increase the offset caused by temperature variations. A reverse-biased diode connected in the emitter circuit would require a second power supply and other circuit complexities.

The diodes 18, 19 provide the additional advantage of voltage regulation. This allows medium-accuracy control applications without the need for the separate Zener regulator to stabilize the voltage for the measuring network. They permit operation of the bridge at low voltage (1.1 volt); this ensures low current flow through the thermistor, reducing offset caused by self-heating of the latter.

This circuit has proved satisfactory in numerous tests, controlling the desired operating temperature (at +39° F.) to within 0.5° F., in a cooling application and at +150° C. within 0.5° C. in a radiant heating application.

The higher temperature application is used to cure resins for bonding strain gauges to tensile test specimens.

Having thus described my invention, I claim:

1. A solid state temperature control circuit comprising a D.C. power source, a measuring circuit including a bridge coupled to the source, one of the legs of said bridge having at least two forward-biased serially-connected diodes, another of said legs having a serially-connected thermistor and a resistor, both of said legs being grounded, a transistor coupled in grounded-emitter configuration to the junction of said resistor and thermistor to amplify signals produced by bridge unbalance, and a load resistor in the collector circuit of said transistor for producing control signals in response to bridge unbalance for controlling the operation of a temperature control.

2. The control circuit of claim 1 wherein the power source is a single D.C. power source coupled across the measuring circuit.

3. The control circuit of claim 1, wherein said diodes and said transistor are silicon.

References Cited

UNITED STATES PATENTS 3,071,676    1/1963    Sandwyk _____ 307—310 XR
3,148,337    9/1964    Spohn _____ 330—28

JOHN S. HEYMAN, *Primary Examiner.*

JOHN ZAZWORSKY, *Assistant Examiner.*

U.S. Cl. X.R.

307—317; 219—499, 501